(12) United States Patent
Morton

(10) Patent No.: US 6,314,119 B1
(45) Date of Patent: *Nov. 6, 2001

(54) EXCIMER LASER WITH PULSE AND BEAM MULTIPLIER

(75) Inventor: Richard G. Morton, San Diego, CA (US)

(73) Assignee: Cymer, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/183,860

(22) Filed: Oct. 30, 1998

Related U.S. Application Data

(63) Continuation-in-part of application No. 09/148,514, filed on Sep. 4, 1998.

(51) Int. Cl.[7] ............................................ H01S 3/22

(52) U.S. Cl. .............................................. 372/57; 372/25

(58) Field of Search ........................................ 372/57, 25

(56) References Cited

U.S. PATENT DOCUMENTS

| | | | |
|---|---|---|---|
| 3,430,048 | 2/1969 | Rubinstein | 250/199 |
| 3,447,856 | 6/1969 | Lange | 350/150 |
| 3,501,222 | 3/1970 | Herriott et al. | 350/171 |
| 4,511,220 | 4/1985 | Scully | 350/403 |
| 4,985,898 | * 1/1991 | Furuya | 372/106 |
| 5,023,884 | 6/1991 | Akins et al. | 372/57 |
| 5,233,460 | 8/1993 | Partlo et al. | 359/247 |
| 5,633,735 | * 5/1997 | Hunter | 359/15 |
| 6,067,311 | * 5/2000 | Morton | 372/57 |

OTHER PUBLICATIONS

Primak, William and Kampwirth, Robert, "The Radiation Compaction of Vitreous Silica", Journal of Applied Physics, vol. 39, No. 12, Nov. 1968, pp. 5651–5658.

Dellin, T.A., Tichenor, D.A., and Barsis, E. H., "Volume, index–of–refraction, and stress changes in electronirradiated vitreous silica", Journal of Applied Physics, vol. 48, No. 3, Mar. 1977, pp. 1131–1138.

Primak, William, "Dependence of the compaction of vitreous silica on the ionization dose", J. Appl. Phys., vol. 49, No. 4, Apr. 1976, p. 2572.

(List continued on next page.)

*Primary Examiner*—Teresa M. Arroyo
*Assistant Examiner*—Gioacchino Inzirillo
(74) *Attorney, Agent, or Firm*—John R. Ross, Esq.

(57) ABSTRACT

An excimer laser with optical pulse multiplication produced by separating a laser beam into a plurality of beams and multiplying the pulse rate in each beam. A pulse multiplier optical system receives the laser output beam and produces multiple output beams, each beam having a larger number of pulses with substantially reduced intensity values as compared to the laser output beam. In a preferred embodiment, $CaF_2$ flats are used along with maximum reflection mirrors to split the laser beam into four beams each with a 4× increased pulse rate. The present invention is particularly important as an improvement to the ArF excimer laser industry to reduce two-photon absorption damage to optical equipment in lithography machines. For damage mechanisms involving two-photon processes, such as the compaction and solarization of fused silica in the DUV spectral region, a factor of four reduction in peak power decreases the quantity of two photon absorption damage done by the synthesized four-pulse burst by a factor of about 16 compared to delivering all of the energy in the single pulse emitted by the laser. This is a useful method of prolonging the lifetime of very expensive beam delivery systems such as those used in photolithography stepper systems without reducing the total dose available at the wafer. In preferred embodiments, the pulse multiplier system is contained in a module which can be pre-aligned and quickly installed on the excimer laser.

11 Claims, 17 Drawing Sheets

OTHER PUBLICATIONS

Rothschild, M., Ehrlich, D.J., and Shaver, D., C., "Effects of excimer laser irradiation on the transmission, index of refraction and density of ultraviolet grade fused silica", Appl. Phys. Lett, vol. 55, No. 13, Sep. 25, 1989, pp. 1276–1278.

Ruller, Jacqueline A. and Friebele, E. Joseph, "The effect of gamma–irradiationon the density of various types of silica", Journal of Non–Crystalline Solids, 136, 1991, pp. 163–172.

Allan, Douglas C., Smith, Charlene, Borrelli, N. F. and Seward, III, T. P., "193–nm excimer–laser–induced densification of fused silica", Optics Letters, vol. 21, No. 24, Dec. 15, 1996, pp. 1960–1962.

Borrelli, N. F., Smith, Charlene, Allan, Douglas C., and Seward, III, T. P., "Densification of fused silica under 193–nm excitation", J. Opt. Soc. Am. B, vol. 14, No. 7, Jul. 1997, pp. 1606–1615.

Sandstrom, Richard, Morton, Richard and Duffey, Thomas, "Dependence of Compaction in Fused Silica on Laser Pulse width at 193 nm", Presented at the Fourth International Symposium on 193 nm Lithography, Sep. 15–17, 1998, Telfts, Austria, 21 pages.

Schenker, Richard, Piao, F., Oldham, W.G., "Material Limitations to 193–nm Lithographic System Lifetimes", Electronics Research Laboratory and Department of Electrical Engineering, University of California, Berkeley, California, 9 pages.

* cited by examiner

PRIOR ART PULSES

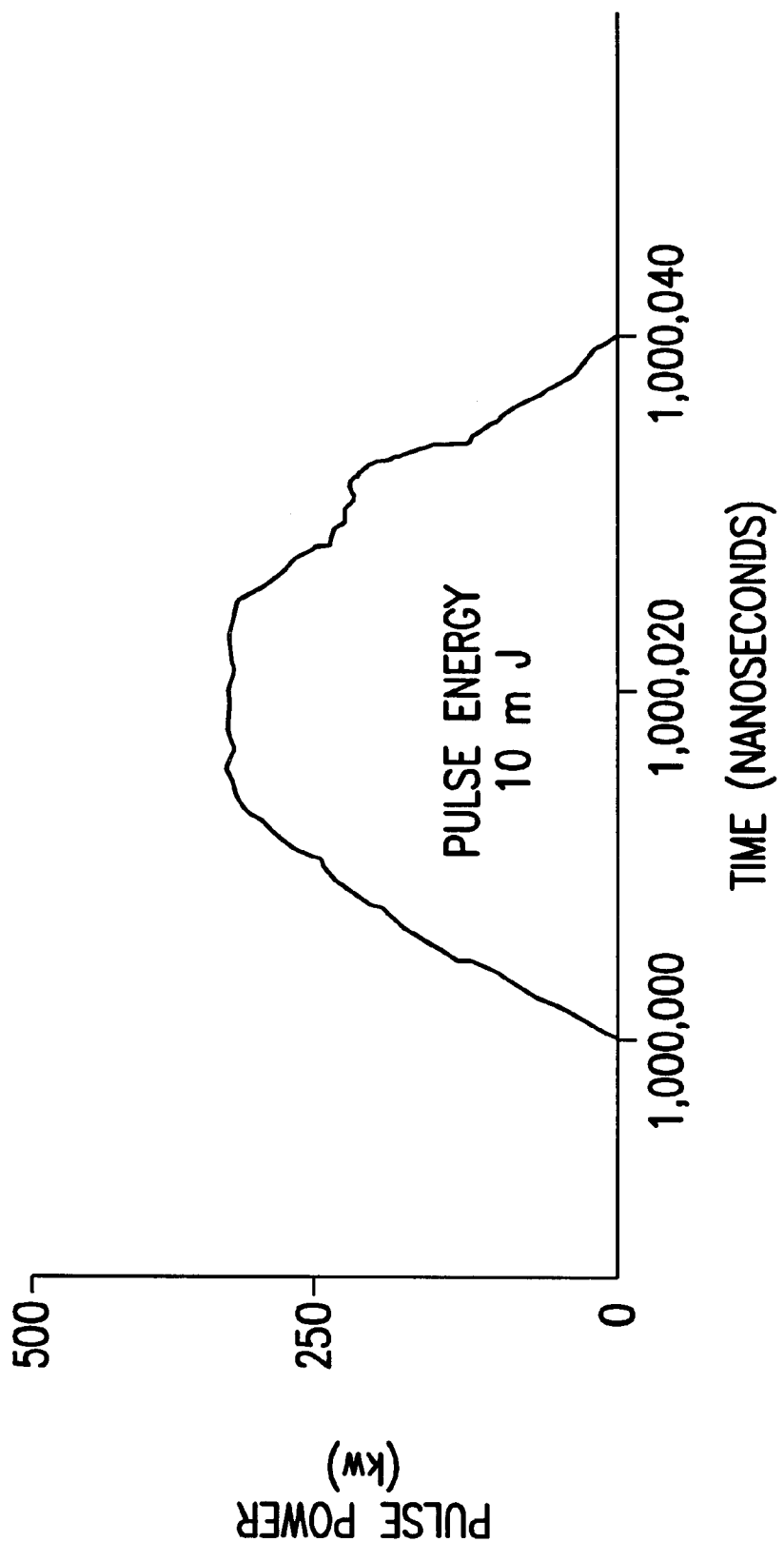

EXCIMER LASER WITH PULSE AND BEAM MULTIPLIER

This invention relates to lasers and in particular to excimer lasers. This application is a continuation-in-part of U.S. Ser. No. 09/148,514 filed Sept. 4, 1998.

FIELD OF THE INVENTION

BACKGROUND OF THE INVENTION

Prior Art Excimer Lasers

Krypton-Fluoride (KrF) excimer lasers are currently becoming the workhorse light source for the integrated circuit lithography industry. The KrF laser produces a laser beam having a narrow-band wavelength of about 248 nm and can be used to produce integrated circuits with dimensions as small as about 180 nm. Such a KrF laser is described in U.S. Pat. No. 5,023,844 which is incorporated herein by reference. A complete description of a state-of-the art production quality KrF laser is described in U.S. patent application Ser. No. 09/041,474 which is also incorporated herein by reference. The Argon Fluoride (ArF) excimer laser is very similar to the KrF laser. The primary difference is the laser gas mixture and a shorter wavelength of the output beam. Basically, Argon replaces Krypton and the resulting wavelength of the output beam is about 193 nm. This permits the integrated circuit dimensions to be further reduced to about 140 nm. A typical prior art excimer laser used in the production of integrated circuits is depicted in FIG. 1. A cross-section of the laser chamber of this prior art laser is shown in FIG. 2. A pulse power system comprised of a commutator module and a compression module and powered by a high voltage power supply module provides electrical pulses to electrodes 6 located in a discharge chamber 8. Typical state-of-the-art 1 ArF lasers are operated at a pulse rate of about 1000 Hz with pulse energies of about 10 mJ per pulse if narrow band. Typical 1000 Hz broad bond ArF lasers may produce about 50 mJ per pulse. The laser gas for an ArF laser, about 0.1% fluorine, 3% argon and the rest neon) at about 3 to 3.5 atmospheres is circulated through the space between the electrodes at velocities of about 25 meters per second. This is done with tangential blower 10 located in the laser discharge chamber. The laser gases are cooled with a heat exchanger 11 also located in the chamber and a cold plate (not shown) mounted on the outside of the chamber. The natural bandwidth of the excimer lasers is narrowed by a line narrowing module as shown in FIG. 1. Commercial excimer laser systems are typically comprised of several modules that may be replaced quickly without disturbing the rest of the system. Principal modules include:

Laser Chamber Module

Pulse Power System with: high voltage power supply module, commutation module and high voltage compression head module, Output Coupler Module Line Narrowing Module Wavelength Stabilization Module Control Module Gas Control Module These and additional modules shown in FIG. 1 are designed for quick replacement as individual units to minimize down time to the laser when maintenance is performed.

Electrodes 6 consists of a cathode and a grounded anode. The anode is supported in this prior art embodiment near the center of the chamber. Flow is counter-clockwise in this view. Peaking capacitor 54 is charged prior to each pulse by pulse power system. During the voltage buildup on peaking capacitor 54 a high electric field is created by two preionizers 56 which produce an ion field between the electrodes and as the charge on the peaking capacitor reaches about 16,000 volts, a discharge across the electrode is generated producing the excimer laser pulse and discharging peaking capacitor 54. Following each pulse, the gas flow between the electrodes of about 2.5 cm per millisecond, created by blower 10, is sufficient to provide fresh laser gas between the electrodes in time for the next pulse occurring 1.0 millisecond later.

In a typical lithography excimer laser, a feedback control system measures the output laser energy of each pulse, determines the degree of deviation from a desired pulse energy, and then sends a signal to the control module to adjust the power supply voltage so that the energy of subsequent pulses are close to a desired energy.

These excimer lasers are typically required to operate continuously 24 hours per day, 7 days per week for several months, with only short outages for scheduled maintenance.

Pulse Multiplication To Avoid Speckle From Coherent Laser Beams

A major advantage of the excimer laser over many other lasers for use as a lithography light source is that the excimer laser beam is naturally very spatially incoherent compared to most other laser sources. Laser beams from other potential lithography laser sources such as a quintupled Nd-YAG is highly coherent and as a result would produce speckle if used for a lithography source. Techniques have been proposed to minimize the speckle produced by pulse beams from these solid state lasers. For example, see U.S. Pat. No. 5,233,460 which is incorporated herein by reference. FIG. 3 shows a pulse delay technique from U.S. Pat. No. 5,233,460. In this case, the output pulses of a coherent laser beam are split into multiple beams which are each subjected to a different delay and are recombined to greatly reduce the coherence of the beam.

The background section of U.S. Pat. No. 5,233,460 recognizes that excimer lasers have multiple spatial mode characteristics and high average power which make the excimer laser well suited for use in microlithography. The multiple spatial mode characteristic is the feature of the excimer laser which is responsible for the naturally, comparatively incoherent output beam of the excimer laser.

Another system designed for speckle reduction is described in a patent by Scully ("Laser Target Speckle Eliminator", U.S. Pat. No. 4,511,220, April 1985). Scully's technique is summarized in FIG. 4.

Pulse Multiplication for Communication

Optical arrangements for multiplying pulses have been proposed for optical commnunication. The system similar to that shown in FIG. 4 was proposed by Rubenstein in 1969 (C. B. Rubenstein, "Optical Pulse Generator", U.S. Pat. No. 3,430,048) for increasing data transmission rates. Another pulse multiplying system designed for use in commnunication was proposed by De Lange (E. O. DeLange et al., "Optical Pulse Multiplexer", (U.S. Pat. No. 3,447,856, June 1969) and an example of one of his techniques for multiplying the number of pulses by 32 is shown in FIG. 5.

Another example of optical pulse multiplexer systems designed for optical is communication is described in a patent by Herriott and Schulte (U.S. Pat. No. 3,501,222).

What is needed is a reliable production quality excimer laser capable of producing high energy with low intensity pulses to reduce damage to optics in beam delivery and imaging systems such as those used in optical lithography steppers.

SUMMARY OF THE INVENTION

The present invention provides an excimer laser with optical pulse multiplication produced by separating a laser beam into a plurality of beams and multiplying the pulse rate in each beam. A pulse multiplier optical system receives the laser output beam and produces multiple output beams, each beam having a larger number of pulses with substantially reduced intensity values as compared to the laser output beam. In a preferred embodiment, $CaF_2$ flats are used along with maximum reflection mirrors to split the laser beam into four beams each with a 4× increased pulse rate.

The present invention is particularly important as an improvement to the ArF excimer laser industry to reduce two-photon absorption damage to optical equipment in lithography machines. For damage mechanisms involving two-photon absorption processes, such as the compaction and solarization of fused silica in the DUV spectral region, a factor of four reduction in peak power decreases the quantity of two photon absorption damage done by the synthesized four-pulse burst by a factor of about 16 compared to delivering all of the energy in the single pulse emitted by the laser. This is a useful method of prolonging the lifetime of very expensive beam delivery systems such as those used in photolithography stepper systems without reducing the total dose available at the wafer. In preferred embodiments, the pulse multiplier system is contained in a module which can be pre-aligned and quickly installed on the excimer laser.

BRIEF DESCRIPTION OF THE DRAWINGS

FIGS. 7 and 7A describe the natural pulses of a state-of-the-art ArF excimer laser on time scales of about 2-½ milliseconds and about 40 nanoseconds, respectively.

DETAILED DESCRIPTION OF PREFERRED EMBODIMENTS

Preferred embodiments of the present invention can be described by reference to the figures.

The 193 nm wavelength of the ArF laser is near the practical, short-wavelength limit of the transmission window in common optical materials used with ultraviolet light in the process of integrated circuit lithography. The high energy of the ArF laser photon (6.4 eV) also increases the probability of nonlinear, two-photon absorption processes. The alkaline-earth fluorides, such as $CaF_2$ and $MgF_2$, as well as fused silica, all have band gaps greater than 6.4 eV and are thus good candidates for ArF optics at moderate intensities, but are subject to two-photon absorption damage at higher intensities. Both linear and nonlinear absorption processes at 193 nm limit the lifetime of UV optics in both the excimer laser and the lithography exposure tool.

For state-of-the art 10 mJ ArF excimer lasers, the dominant excimer laser beam fused silica absorption is not through the linear absorption coefficient $a_o$ but through two-photon absorption. Two-photon absorption is the initial step for the formation of color centers (solarization) and compaction (in $SiO_2$), although the processes leading to these two effects are different. The two-photon absorption process is nonlinear, increasing as the square of the laser power intensity ($W/cm^2$), because the process requires the presence of two photons simultaneously in the vicinity of the absorbing atom. The probability of two photons being at the same place (i.e., the reaction space associated with a particular atom), at the same time is proportional to the laser beam intensity squared (as measured in watts/$cm^2$ or photons/second-$cm^2$, since the probability of each of the two photons being in the reaction space increases linearly with the intensity.

Four X Pulse Multiplier

Figure 1:
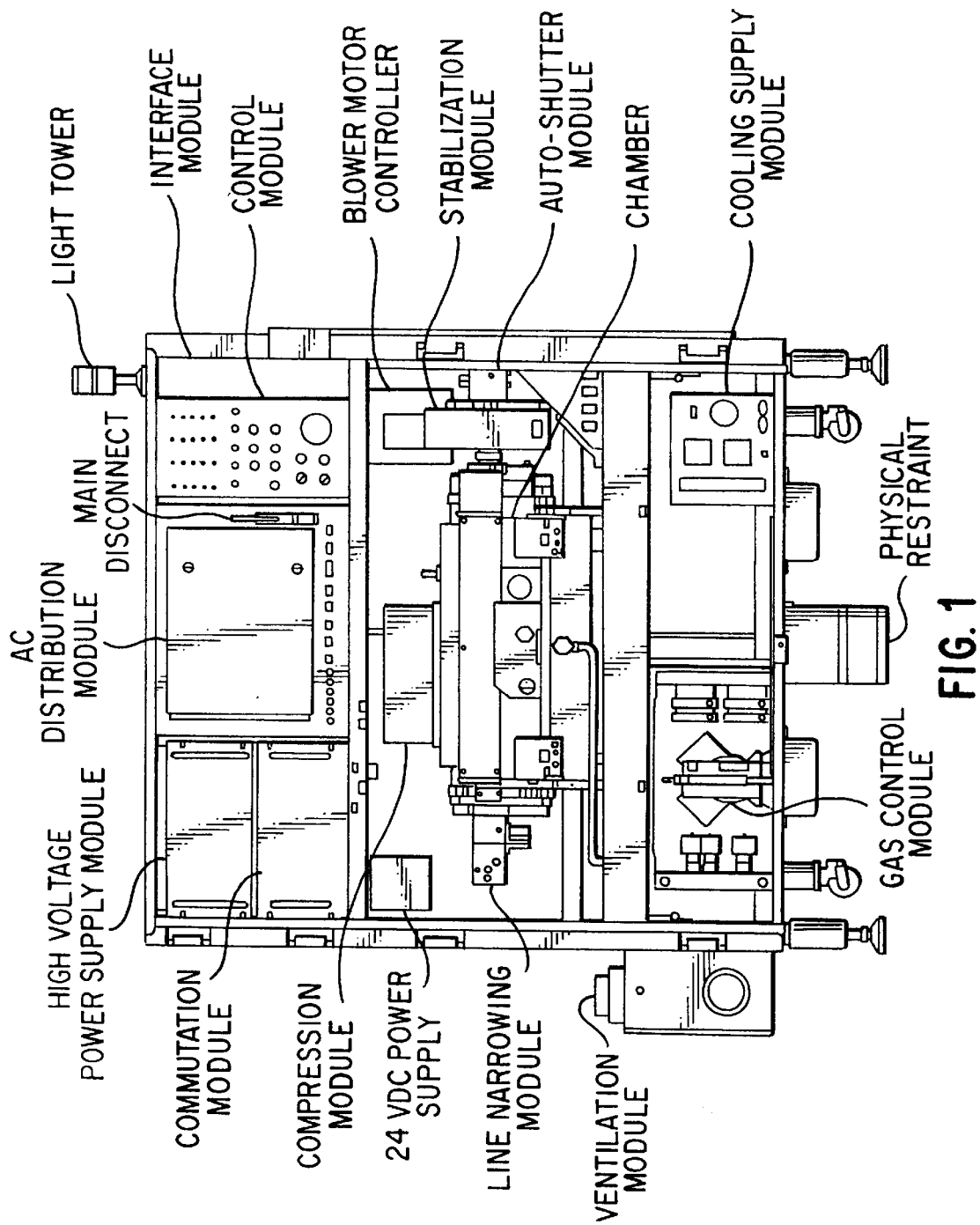
FIG. 1 is a drawing of a state-of-the art modular excimer laser.
Figure 2:
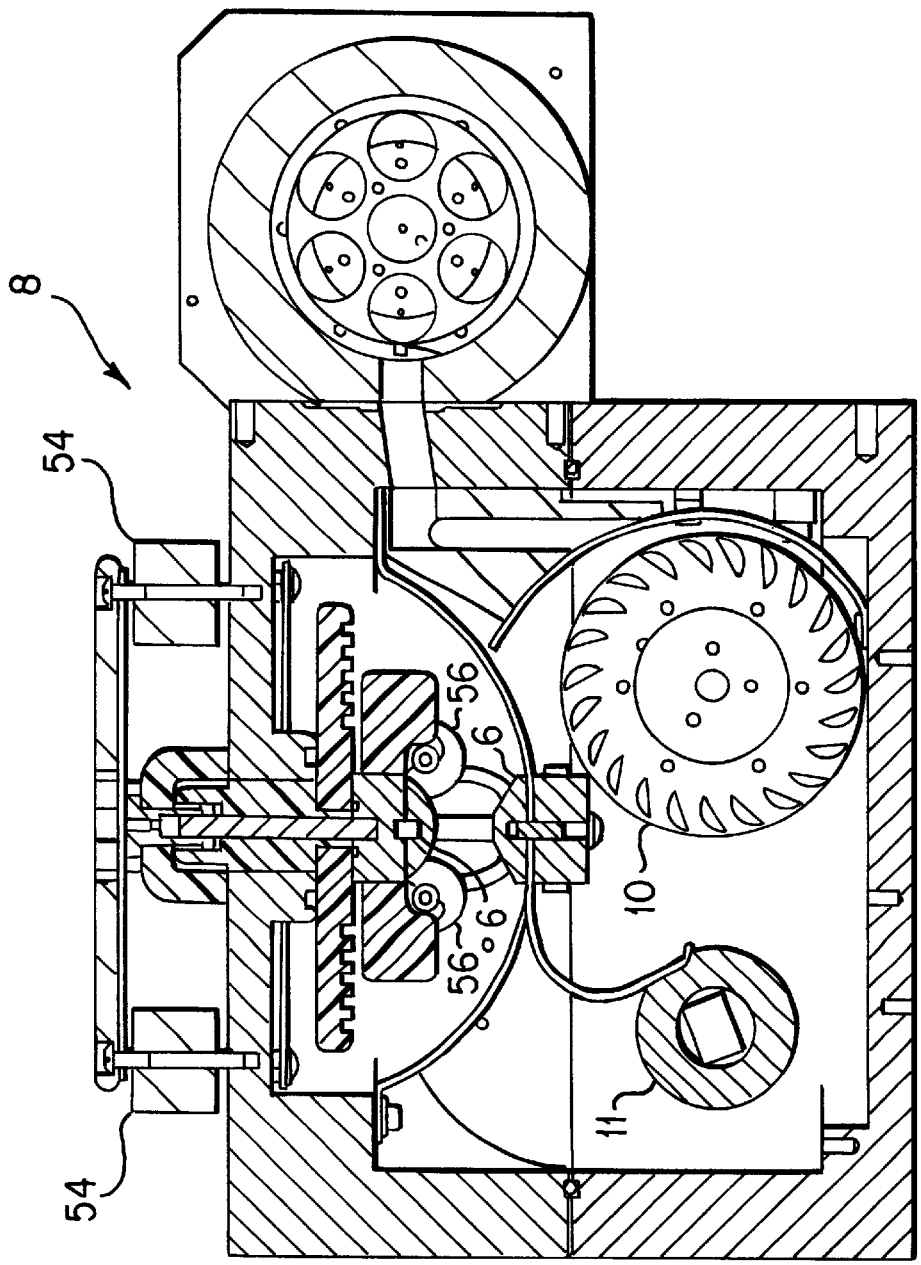
FIG. 2 is a cross section drawing showing a section of the laser chamber of the FIG. 1 laser.
Figure 3:
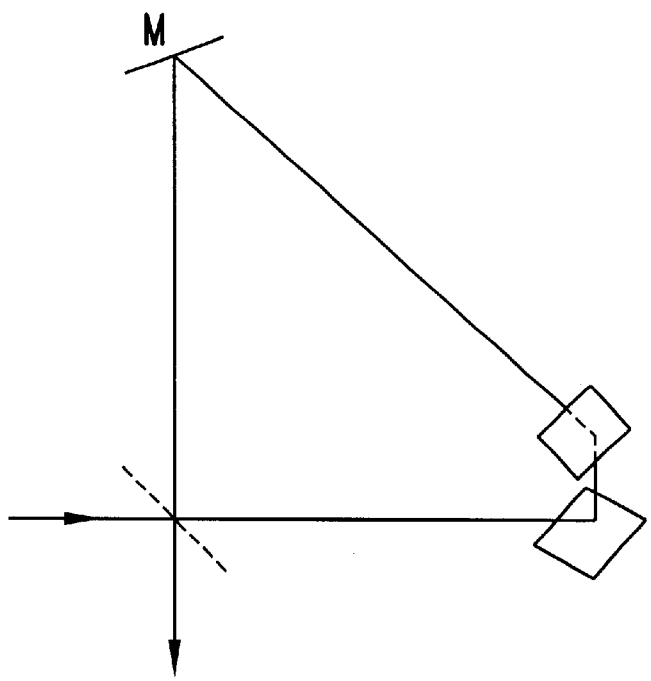
FIGS. 3, 4 and 5 are drawings showing prior art pulse multiplying techniques.
Figure 4:
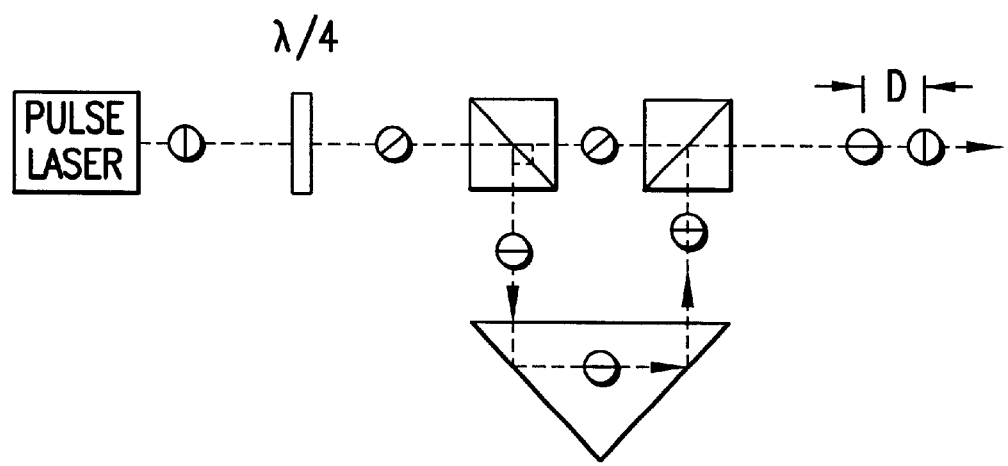
Figure 5:
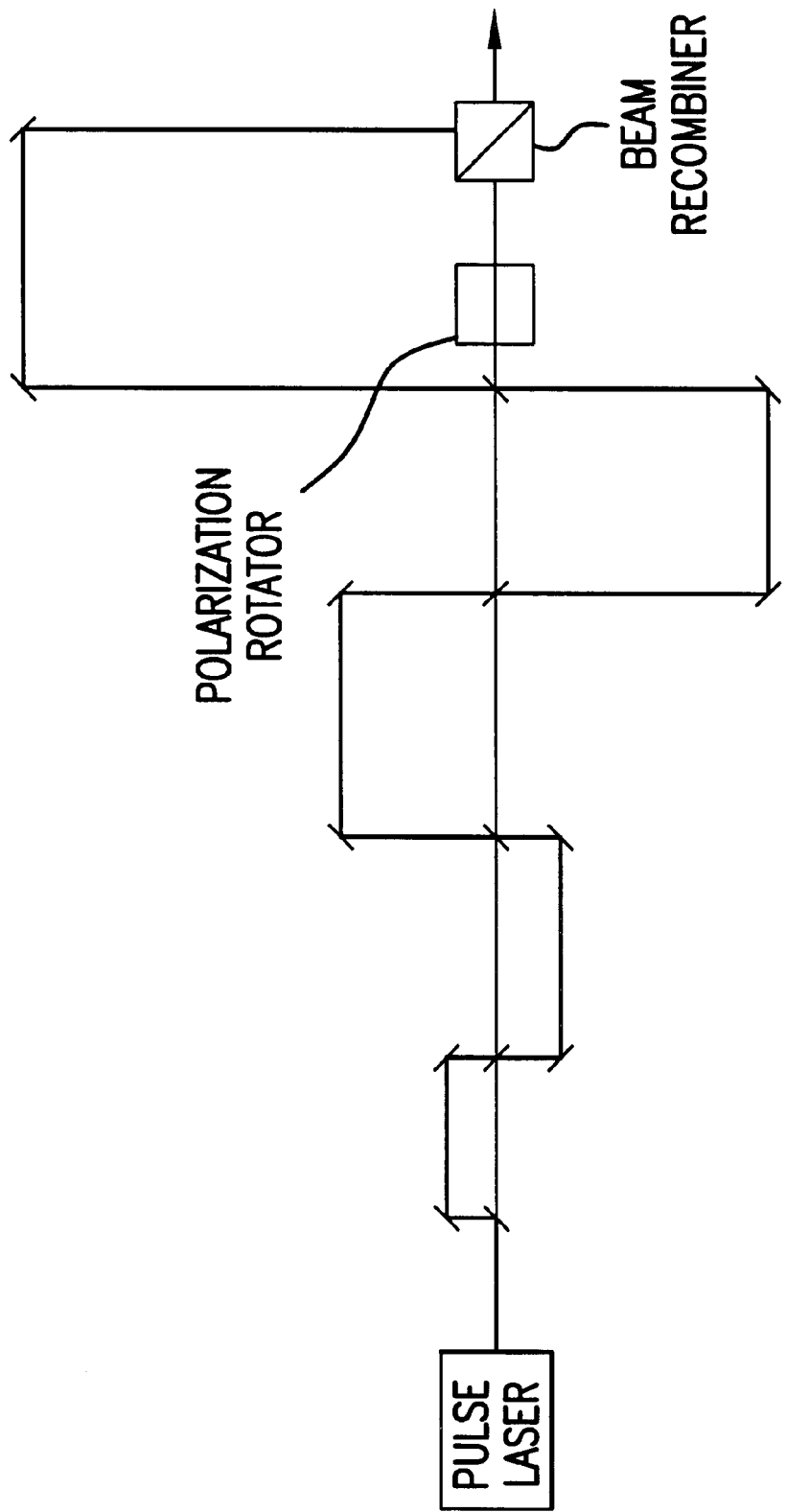
Figure 6:
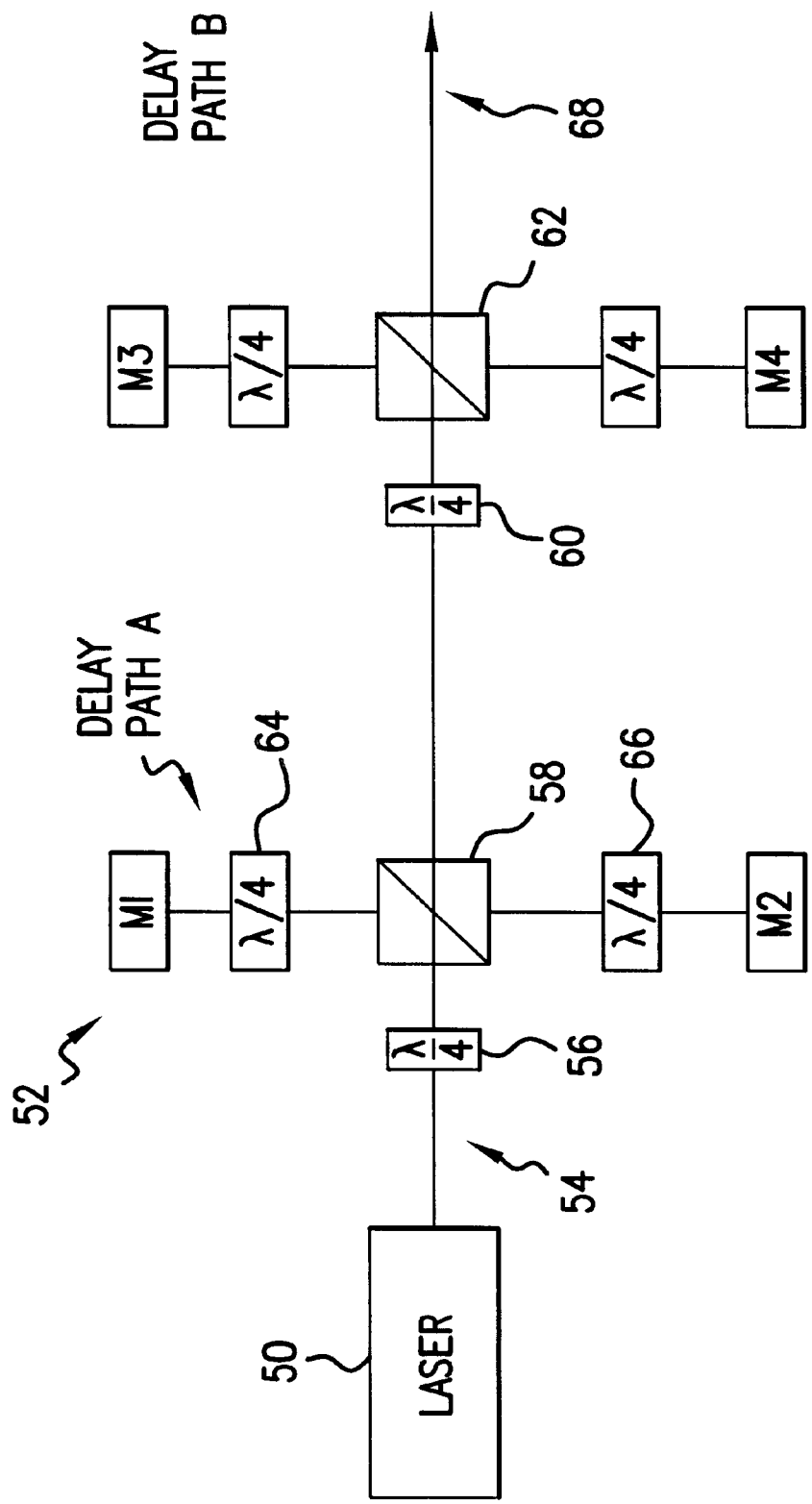
FIG. 6 is a sketch describing the pulse multiplying principals of a preferred embodiment of the present invention.

FIG. 6 shows an optical schematic of a first preferred embodiment of the present invention. This is a low loss optical pulse multiplier 52 which quadruples the effective pulse repetition rate of the ArF laser source 50 without significantly reducing the total energy throughput. All pulses leaving the multiplexer propagate along the same beam line with near-perfect overlap.

ArF laser 50 emits plane-polarized light at a wavelength of 193 nm and at a pulse repetition rate of 1000 Hz. A typical beam cross-section is about 0.3 cm ×1.3 cm or about 0.39 $cm^2$. The pulse energy is about 10 mJ. The number of 193 nm photons in each pulse, therefore, is about 1×$10^{16}$ photons which are spread across the beams 0.39 $cm^2$ cross section. A typical ArF pulse, as displayed in FIG. 7A has a duration of about 40 ns which gives it a spatial length of about 12 meters. There, the pulse defines a spatial volume of about 468 $cm^3$ within which these $10^{16}$ photons are traveling. Because the spatial distribution of photons across the cross section of the beam in the horizonal and vertical directions varies by about 30 to 40 percent and because of the temporal variation in intensity generally as indicated in FIG. 7A, the peak density is roughly 2 to 4 times the average density.

With ArF 6.4 eV photon densities in the range of $10^{13}$–$10^{14}/cm^3$, two photon absorption in UV optics is very significant. Two photon absorption can be reduced by either spreading the pulse spatially or temporally. Spatial spreading of the beam means larger optics and this invention does not deal with this alternative. The pulse can be spread temporally by changes in the design of the laser to extend the duration of the discharge, and this invention also does not deal with this alternative. This invention permits a passive temporal optical spreading of the pulse.

The plane of polarization of the ArF laser beam 54 is horizontal, and therefore "P" with respect to the first polarizing beamsplitter it encounters. A first quarter wave plate 56, inserted between the laser and a first beamsplitter 58 converts the polarization state to circular. One half of the light, the "P" component, passes through 50/50 polarizing beamsplitter 58 with no loss other than the scatter and absorption associated with this optical element. The other half of the light, the "S" component, is reflected into the first, or "A" delay path.

Returning to the "P" component, which has passed through first beamsplitter 58 undelayed, the next optic encountered is a second quarter wave plate 60 which converts the polarization of the light to circular, and then a second 50/50 polarizing beamsplitter 62, oriented the same way as the first one so it reflects one half of the light into delay path B. One half of the "P" polarized light passes straight through this second beamsplitter. This is the first sub-pulse in a burst of 4 sub-pulses to exit the pulse multiplier.

At beamsplitter 58, the "S" component is reflected into delay path "A". After making two passes through a third quarter wave plate 64, reflected by the mirror M1, it is converted to "P", which passes through the first beamsplitter 58. The rest of the delay path "A" contains another mirror, M2, and a fourth quarter wave plate 66, which returns the light to the original path, but now as "S" polarization. Delay path "A" adds sufficient path length to partially or completely separate the arrival times of pulses #1 and #2 at the sample location. The #2 pulse has "S" polarization as originally defined and is reflected toward quarter wave plate 60 which converts the polarization state to circular. Again, one half of this light exits the multiplexer with no further delay.

Figure 6A:
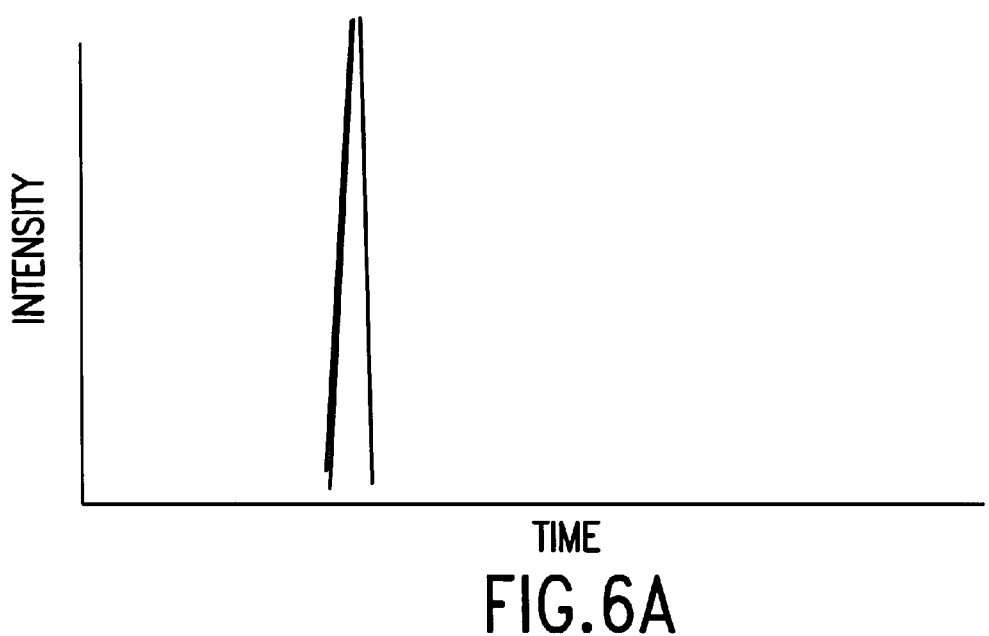
FIGS. 6A and 6B are graphs showing the effects of pulse multiplication

Both pulses #1 and #2 send one half of their light to delay path "B" because of the quarter wave plate located ahead of the third beamsplitter. Delay path "B" has about twice the path length of delay path "A". These further-delayed pulses become sub-pulses 3 and 4. The mirrors M3 and M4 and the two quarter-wave plates in delay path "B" perform the same functions as their counterparts in delay path "A". This sequence is repeated for every pulse of the source laser, so that a 4-pulse burst leaves the multiplexer for each single source laser pulse. There is no significant change in the total energy delivered, but the peak powers experienced by any following optical component are greatly reduced. A laser pulse at 54, leaving the laser is depicted qualitatively in FIG. 6A and the four pulses at 68 leaving beamsplitter 62 is depicted qualitatively in FIG. 6B.

Figure 6B:
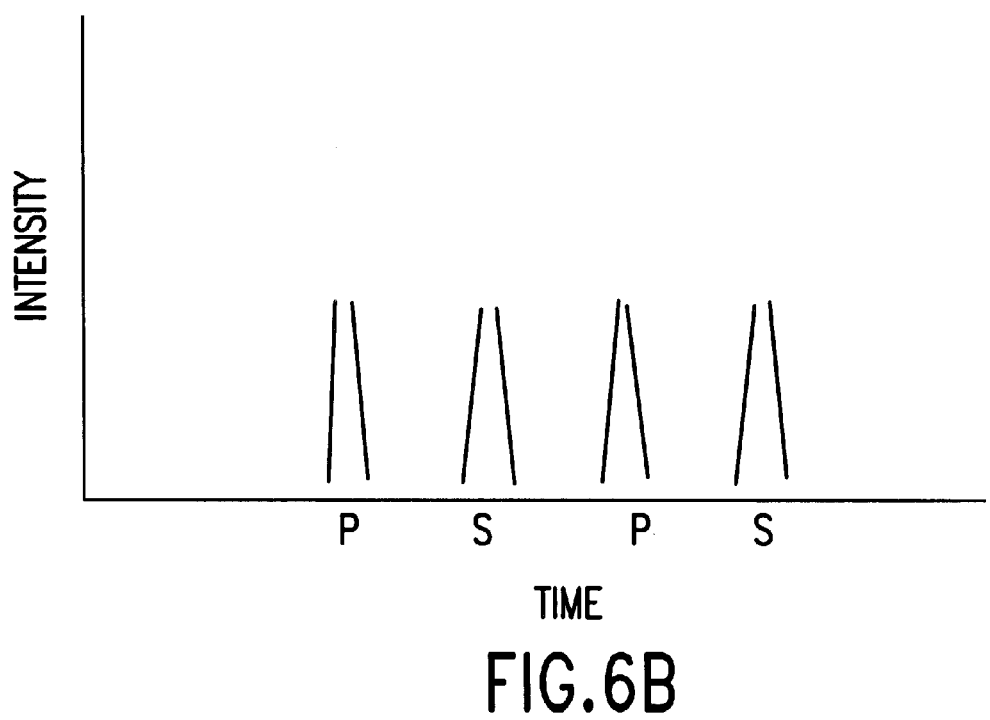

Looking at FIG. 6B, it can be seen that pulses 1 through 4 arrive with alternating "P" and "S" polarizations according to the initial definition. This becomes meaningless for most optical lens systems in which the angles of incidence do not depart from normal by more than, for example, ±20 degrees. For those systems which normally operate with circularly polarized light, another quarter wave plate can be placed at the output of the invention described to convert all of the "S" and "P" pulses to circular polarization.

For a system requiring linear polarized light of one polarization only, a Pockel's cell can be added at the output and temporally switched to convert 2 of the pulses so that all 4 have the same polarization state.

Beam Multiplier Module

In a first preferred embodiment of the present invention, a beam multiplier module is attached to a state of the art ArF modular excimer laser used for integrated circuit lithography. The module contains optical components to define a delay path A and a delay path B as described with respect to FIG. 6. Delay path A is shown in FIG. 9A and delay path B is shown in FIG. 9B. Delay path A is about 6 meters, and delay path B is about 12 meters. The 6 meter delay path will produce a temporal delay of about 20 nS, and the 12 meter delay will produce a delay of about 40 nS.

The results are indicated by a comparison of FIGS. 7 and 7A to FIGS. 8 and 8A.

Figure 7:
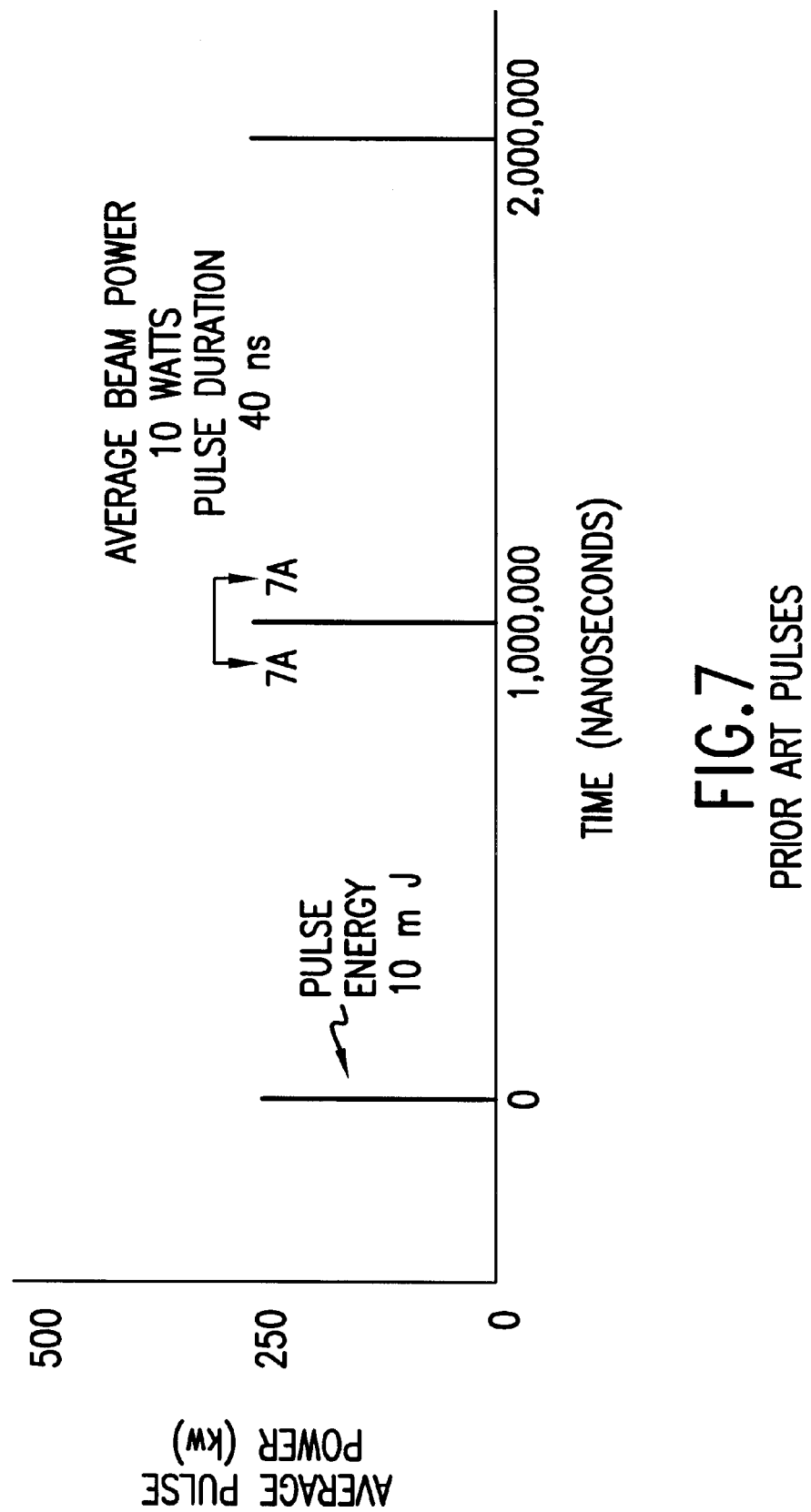

FIG. 7 represents a typical pulse laser beam of a state of the art ArF laser operating at 1000 Hz with 10 mJ pulses. The pulse duration is about 40 nS, and the general temporal shape of a typical single pulse is shown in FIG. 7A. The average pulse power is about 250 kw, and the peak pulse power is about 300 kw. The reader should note that the 40 ns duration pulse (on the 2-½ millisecond time scale) appear as three vertical lines on FIG. 7.

Figure 8:
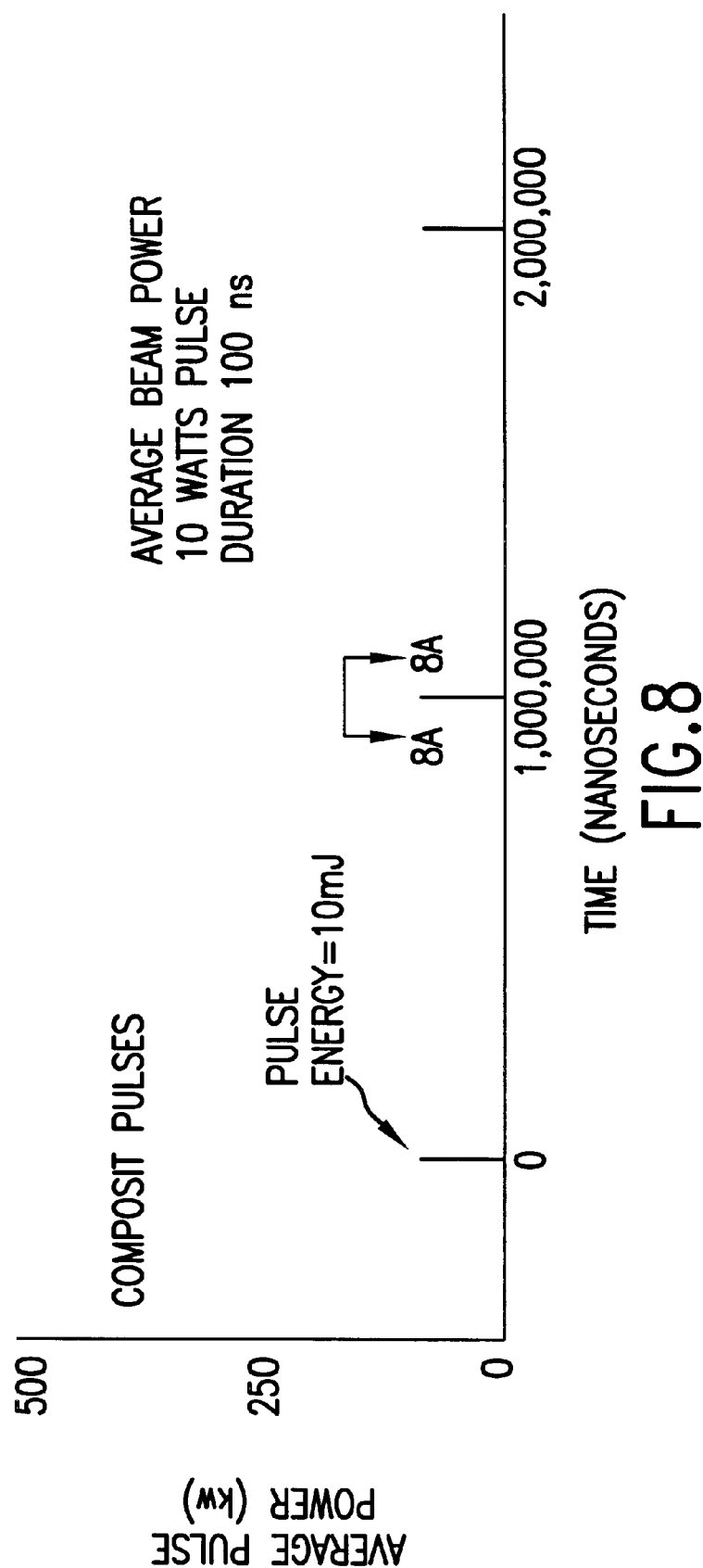
FIGS. 8 and 8A show the results of a preferred pulse multiplication technique.
Figure 8A:
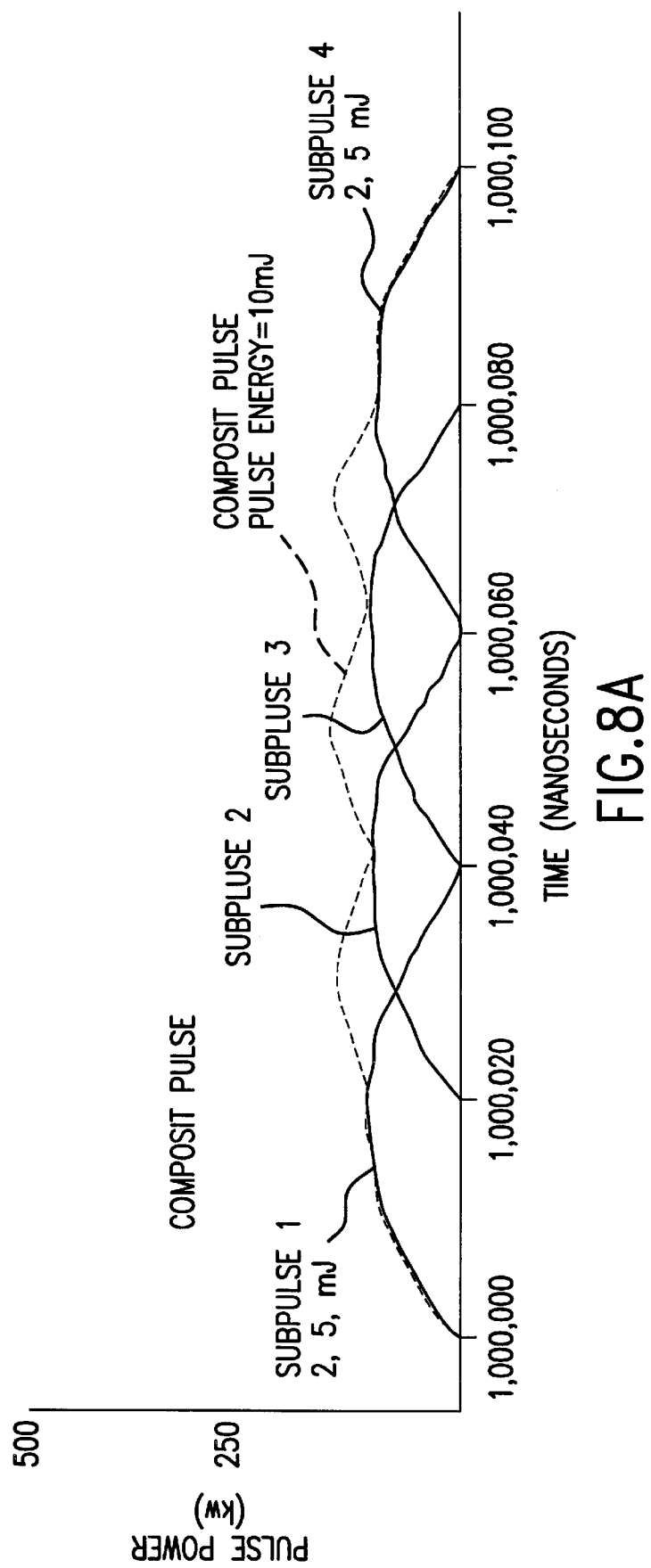
Figure 9:
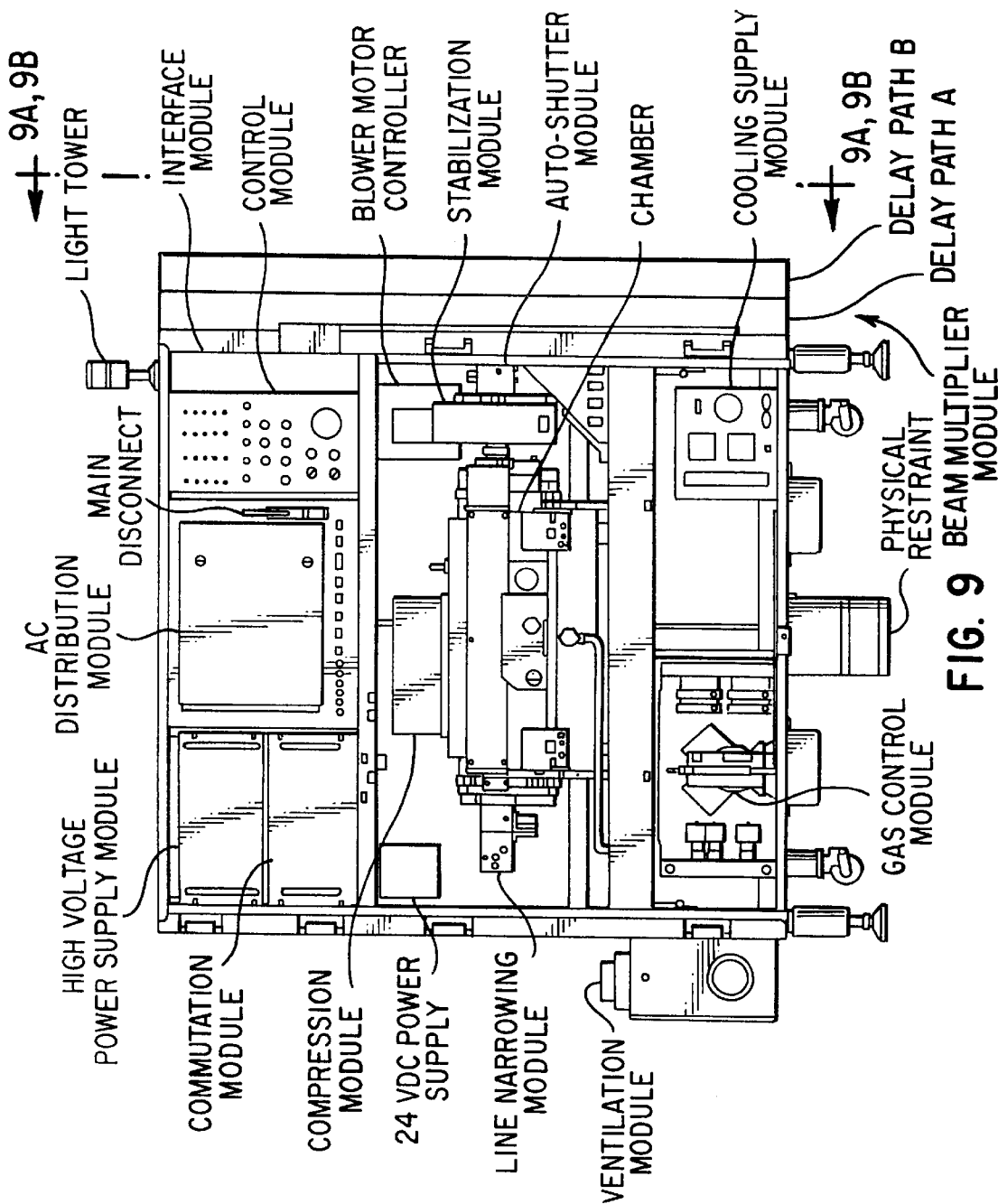
FIG. 9 is a drawing of a state-of-the-art ArF laser with a pulse multiplication module mounted on its output side.
Figure 9B:
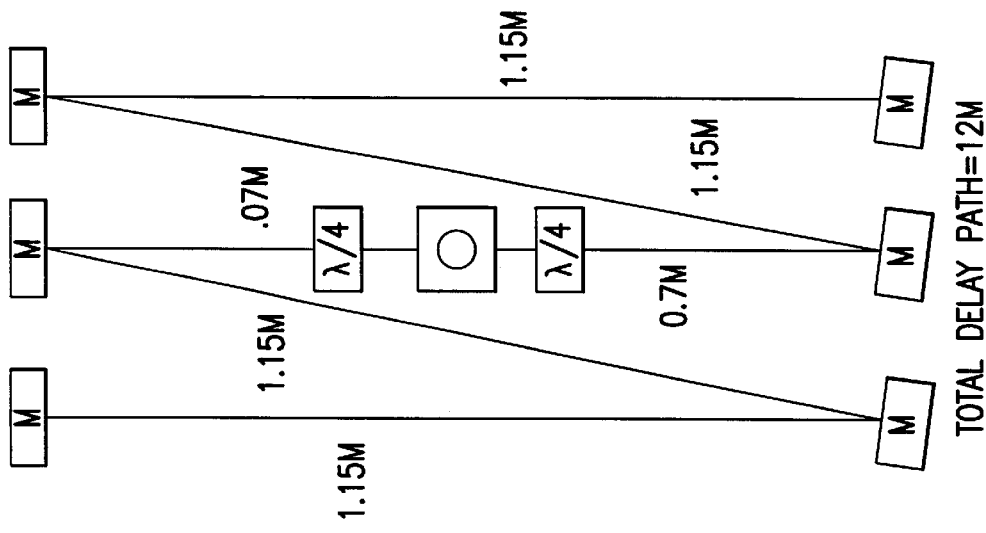
FIG. 9B shows a delay path B of the FIG. 9 embodiment.
Figure 9A:
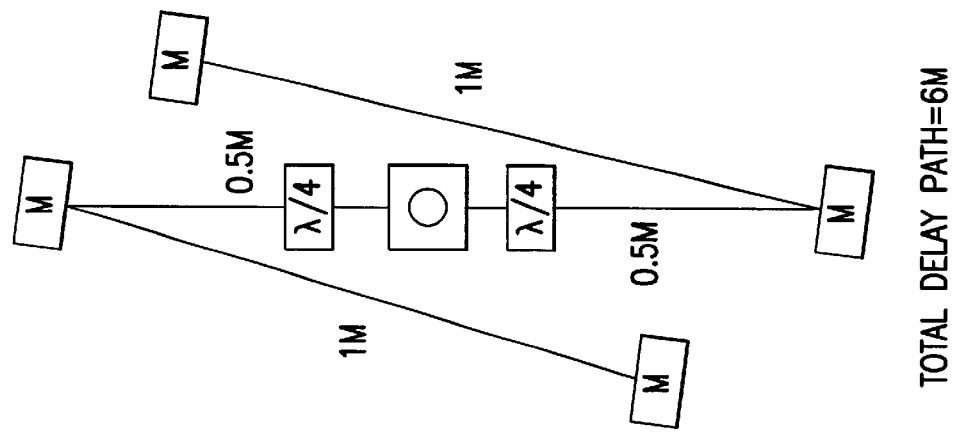
FIG. 9A shows a delay path A of the FIG. 9 embodiment.

FIG. 8A shows four pulses created by the FIGS. 9, 9A and 9B pulse multiplying module. Sub-pulse 1 appearing at 1,000,000 ns after time zero is not delayed at all as compared to the original pulse. Sub-pulses 2, 3 and 4 are delayed 20 nS, 40 ns and 60 ns respectively, and each pulse carries about 2.5 mJ. The four sub-pulses follow the same beam path on exiting the multiplexer and form a composite pulse having substantially all of the energy of the original pulse of 10 mJ, but the pulse is now spread over about 100 ns and the average composite pulse power has been reduced from about 250 kw to 100 kw, and the peak pulse power has been reduced from about 300 kw to about 150 kw.

Rotating the Polarization

In a second preferred embodiment, a pulse multiplying technique similar to that described by Partlo and Oldham in U.S. Pat. No. 5,233,460 for coherence reduction is used in a pulse multiplier module 79 to reduce the intensity of ArF excimer laser pulses. In this embodiment beamsplitter 80 has one surface which is anti-reflection coated and the other surface coated for partial reflectance and partial transmission. We define the reflectance of the beam-splitter as $R_S$ for the S-polarization and $R_P$ for the P-polarization. Likewise for the transmittance: $(1-R_S)$ for the S-polarization and $(1-R_P)$ for the P-polarization.

The stage is aligned such that the laser source is incident with its energy in the P-polarized state. A fraction equal to $R_P$ of the incident energy will be reflected by the beamsplitter which $(1-R_P)$ will pass through the beamsplitter and then on to the 45 degree mirrors. Two 45 degree mirrors 82A and 82B are arranged so that they transmit the beam up and over, changing both its direction of travel and its polarization relative to its direction of travel. The beam is then incident on three normal mirrors 84A, 84B and 84C directing it back to beamsplitter 80 after a total delay path of about 30 feet to provide a 30 ns pulse delay.

After making a full traversal of the delay arm, the pulse encounters the beamsplitter again, but this time in the S-polarization state, and thus $S_S$, will be reflected which $(1-R_S)$ will be transmitted and travel along the same path as the original reflected fraction. At this point there remains $(1-R_P)R_S$ of the original laser pulse energy inside the delay arm. This energy is again rotated by the two 45 degree mirrors and travels via the normal mirror back once again to the beamsplitter. The polarization has now returned to the P state and thus the beamsplitter will transmit $(1-R_P)$ of this energy.

Three individual pulses have now been created by this stage, two with P-polarization and one with S-polarization. Assuming zero losses inside the delay arm, these three pulses will have the following fractions of the original pulse energy:

sub-pulse #1 (P-polarized): $R_P$ sub-pulse #2 (S-polarized): $(1-R_P)(1-R_S)$ sub-pulse #3 (P-polarized): $(1-R_P)R_S(1-R_P)$.

Figure 10:
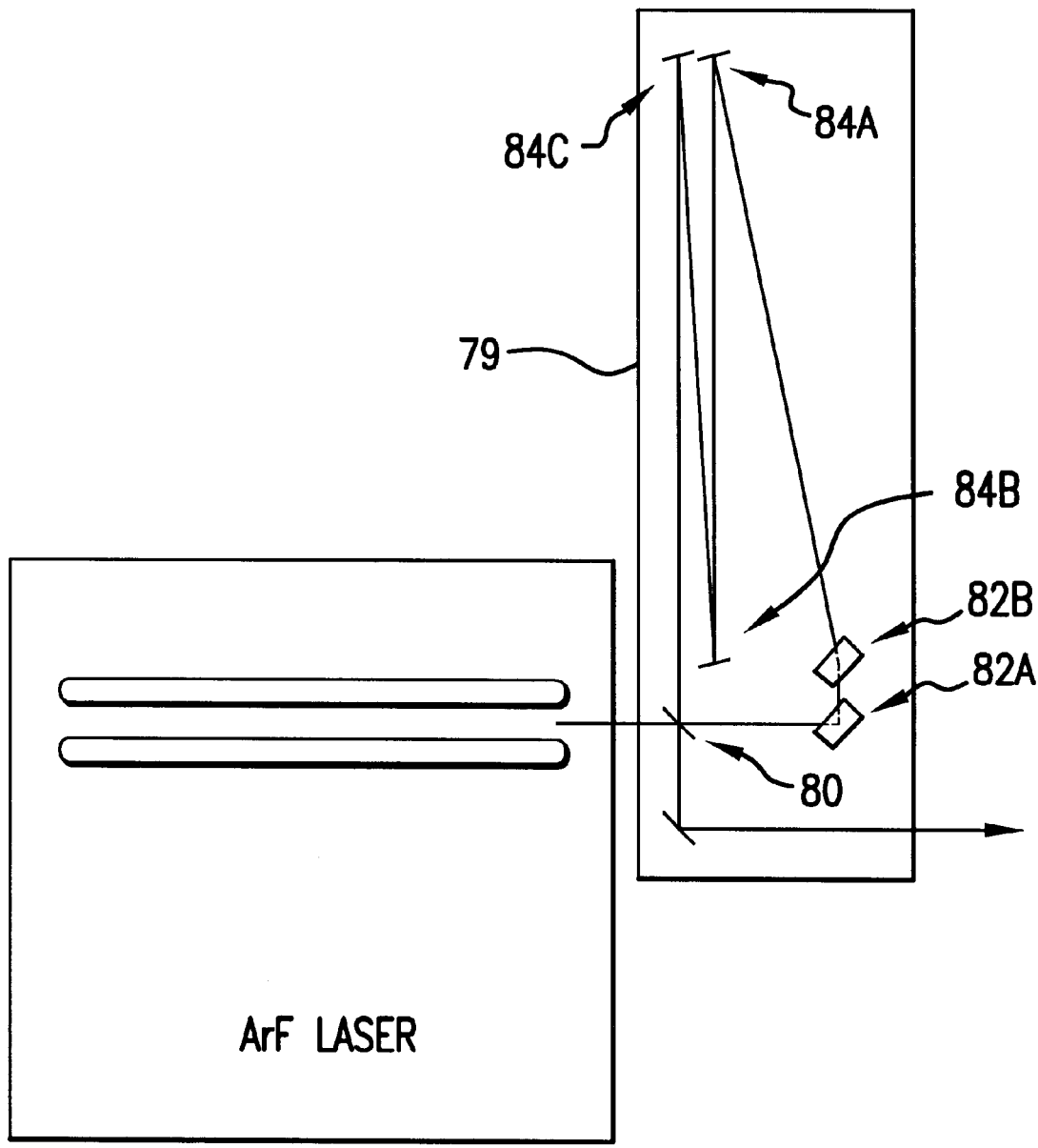
FIG. 10 is a sketch of a second preferred embodiment of the present invention.
Figure 10A:
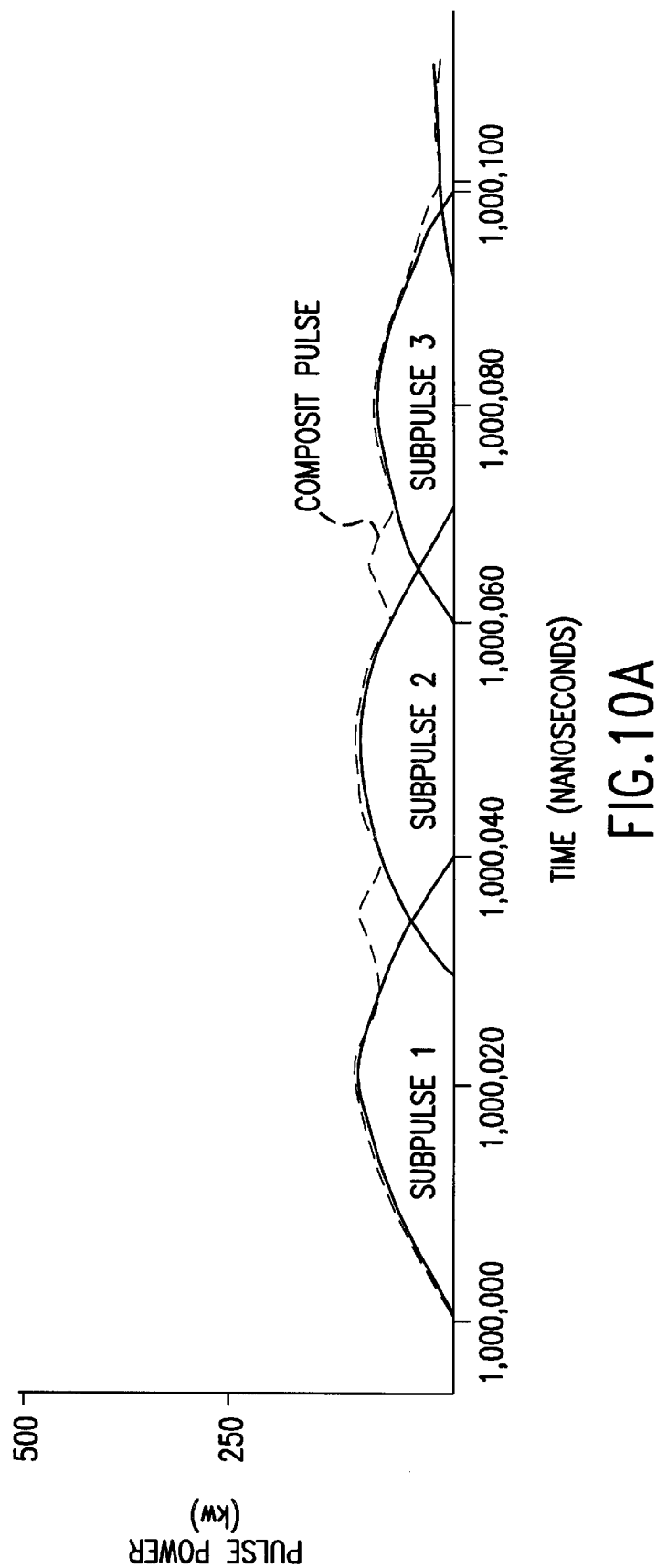
FIG. 10A shows the results of the FIG. 10 embodiment.

Ideally we would like these three sub-pulses to be equal. Since there are three separate quantities and only two independent variables, $R_P$ and $R_S$, we can only hope to minimize the difference between the three sub-pulses. The minimum difference is obtained with a value of $R_P$=0.29 and $R_S$=0.59. FIG. 10A shows an approximation of the laser pulse intensity versus time at the output of a single multiplier stage using $R_P$=0.29 and $R_S$0.59, with the input pulses similar to the typical ArF 10 mJ laser pulse shown in FIG. 7A. Note that sub-pulse 1 is P-polarized, sub-pulse 2 is S-polarized and sub-pulse 3 is P-polarized. The pulse has a long tail representing about 12 percent of the total pulse energy.

Simple Loop Pulse Multiplier

Figure 11:
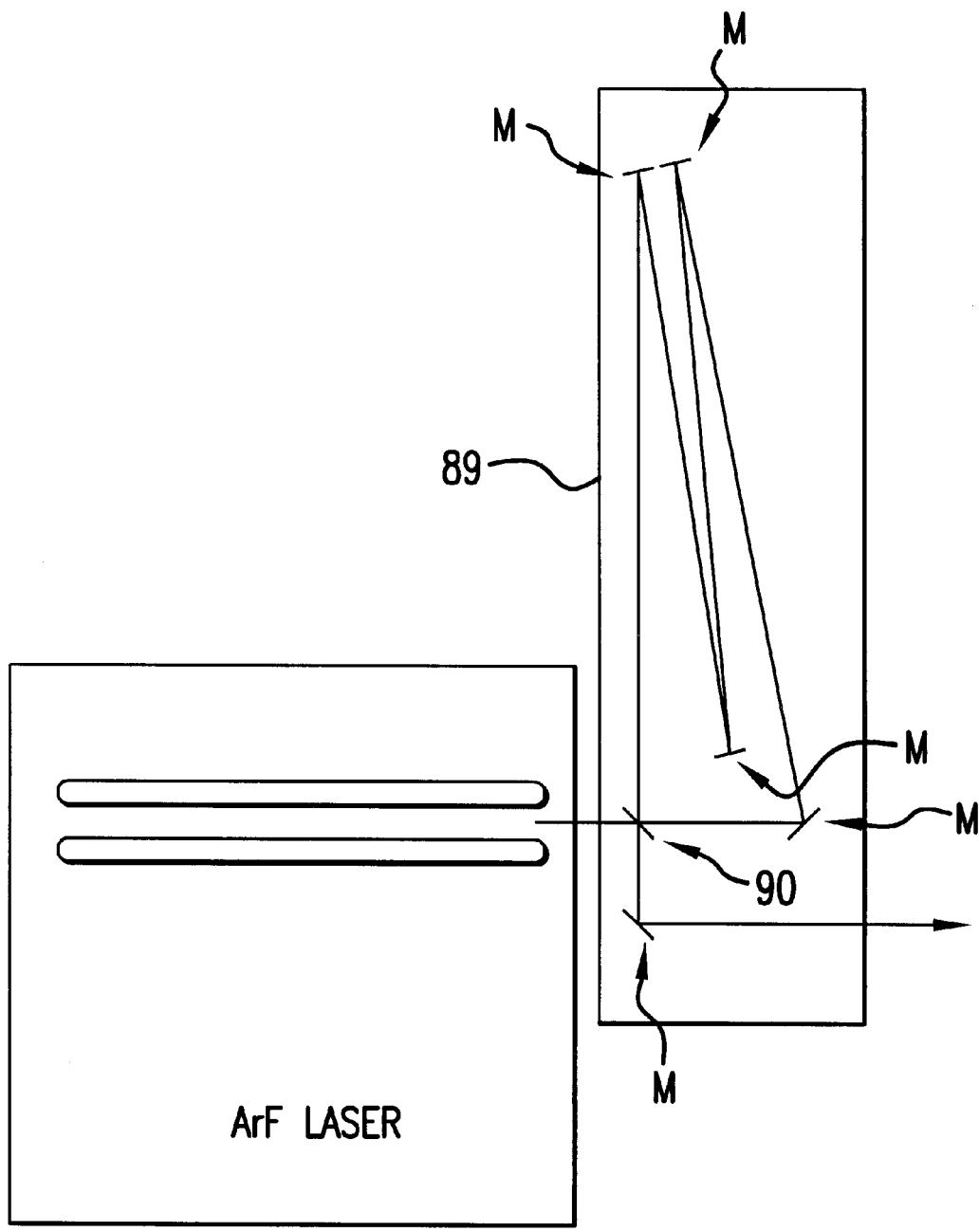
FIG. 11 is a sketch of a third preferred embodiment of the present invention.
Figure 11A:
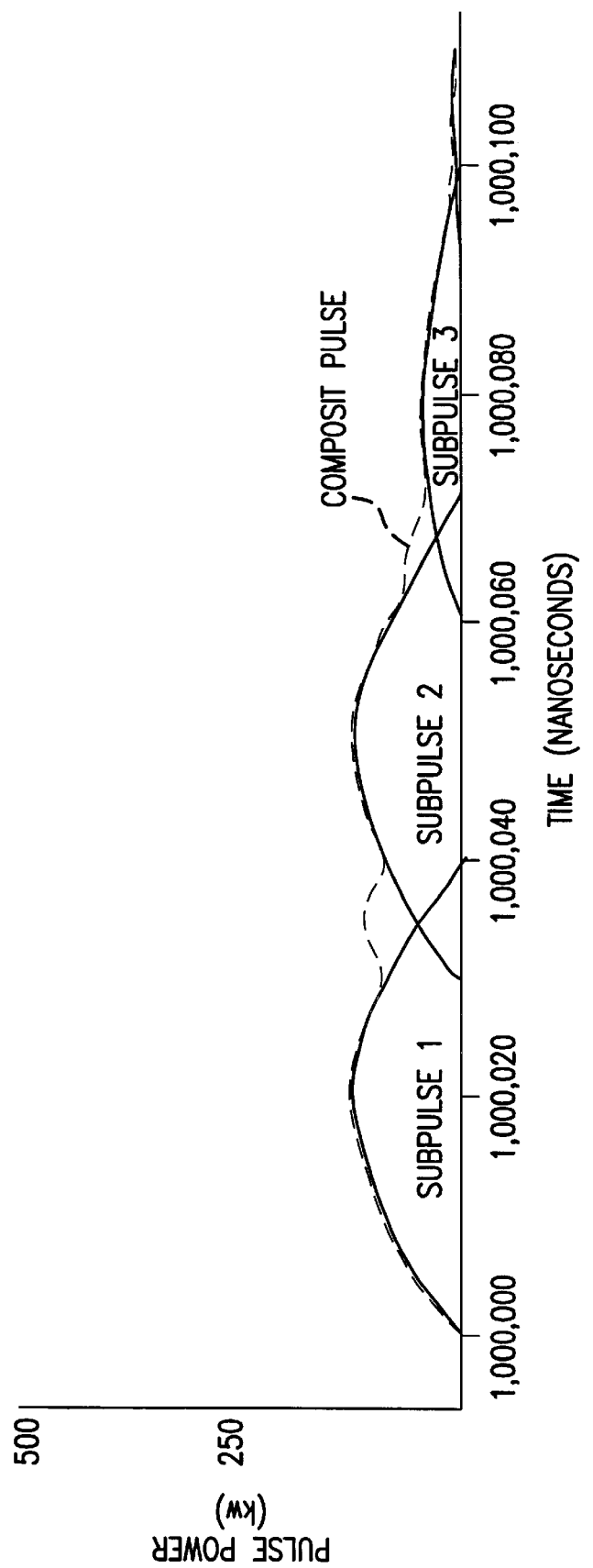
FIG. 11A shows the results of the FIG. 11 embodiment.

A third preferred embodiment of the present invention is shown in FIG. 11. This embodiment is substantially the same as the one described above except the polarization of the beam is not rotated. The multiplier module 89 comprises a beamsplitter 90 and five total reflection mirrors. Beamsplitter 90 is a reflective-transmissive beam splitter and is chosen to reflect 38 percent to the horizontally polarized light exiting the ArF laser as sub-pulse 1 and to transmit about 62 percent of the beam which, as above, is delayed 30 ns before it returns to beamsplitter 90. Again 62 percent of the originally transmitted 62 percent portion (or 38 percent of the original beam) is transmitted as subpulse 2 and about 24 percent of the original beam is reflected again so that the third subpulse transmitted through beamsplitter 90 is delayed 60 ns and represents about 15 percent of the original beam. Similarly, the fourth subpulse is delayed relative to the first pulse by 90 ns represents about 5 percent of the original pulse. A sketch of the subpulse and the composite beam is shown in FIG. 11A. This embodiment also has a long tail on the pulse. Note that this long, gradually shrinking tail could be trimmed with a fast pulse trimmer of the type disclosed in U.S. patent application Ser. No. 08/897,665 which is incorporated herein by reference. This would permit very precise pulse energy control.

Installing and Aligning

Preferably the beam multiplier module is installed on the output side of the laser as indicated in FIG. 9. A preferred installation would utilize three pins aligned in a triangular pattern and three alignment bolts aligned in a triangular pattern interspersed with the pins in order to provide angular adjustment of the beam multiplier optics in relation to the laser optics.

Pulse and Beam Multiplication

There exists a need to perform accelerated life testing of optical materials intended to be used in ultraviolet laser systems at wavelengths in the range of about 193 nm. This acceleration cannot be achieved by increasing the energy per pulse in an attempt to accumulate the same total dose in a shorter period of time, because it is known that the damage processes are non linear; in fact, scaling as the square of the exposure intensity. The only way to accurately simulate the expected lifetime of optics which will be used for many years at relatively low pulse repetition rate and/or duty cycle is to use the same energy and power at a higher pulse repetition rate. Producing a deep ultraviolet laser with a significantly higher pulse repetition rate than that currently available is much more difficult than artificially increasing the apparent rate by the use of an optical multiplexer using polarizing beam splitter cubes and delay paths.

For extremely large pulse counts, in the 100 billion range, a multiplexer is the only available method of significantly increasing the pulse delivery rate to the optics under test. The weakness of multiplexers using quarter wave plates and polarizing beam splitter cubes (prior art) is the splitter coating itself. Such complex multi-layer dielectric coatings are more subject to damage than the samples under test, and so these optics would have to be replaced many times during a 100 billion shot run, at great cost and with the loss of time associated with realignment and recalibration of the system. There are similar, but comparatively less damage-susceptible, multi-layer dielectric coatings on the high reflectivity mirrors in the beam delay paths of prior art multiplexers.

Figure 12:
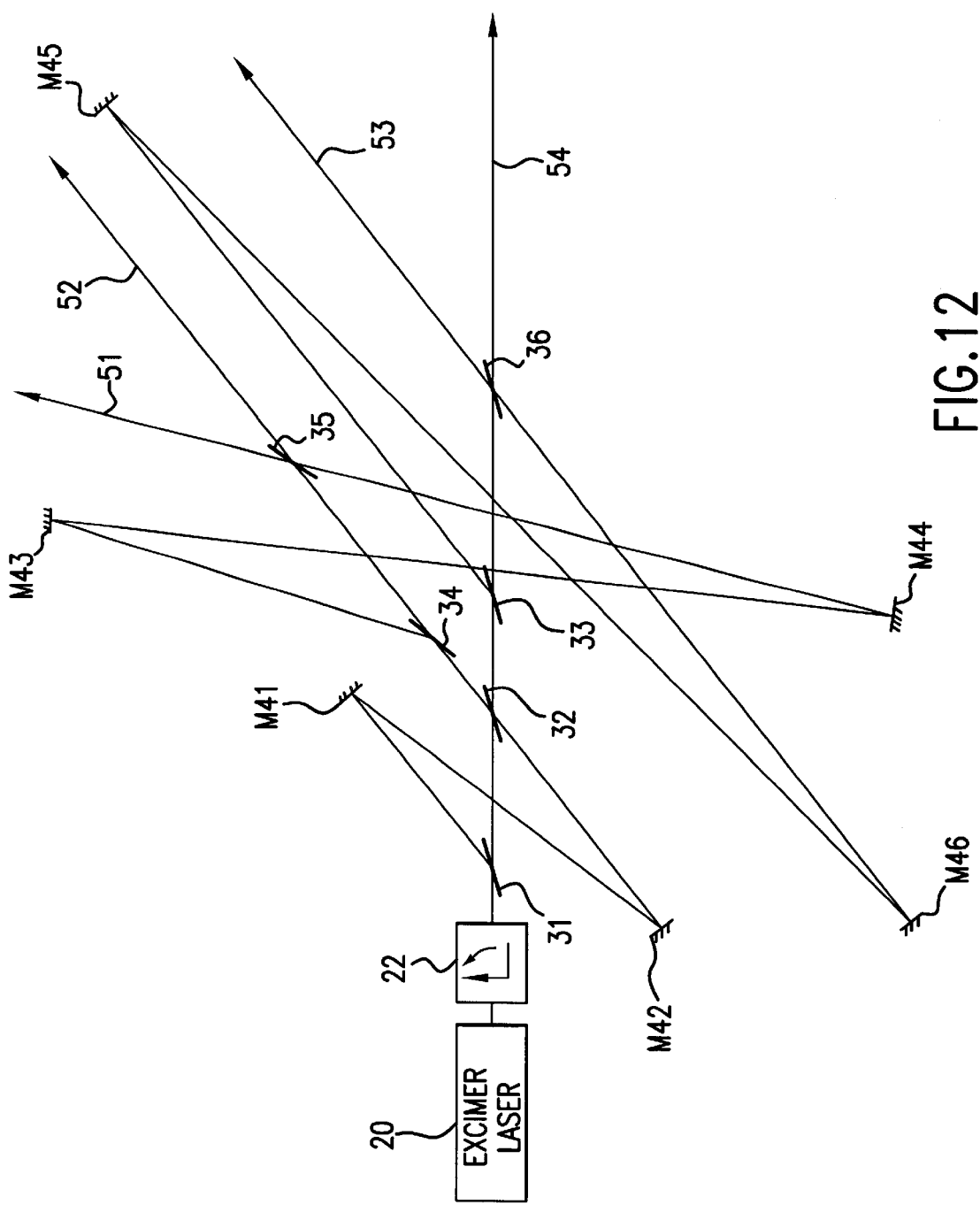
FIG. 12 shows an optical arrangement for multiplying both pulse rate and beams.

The system shown in FIG. 12 totally eliminates the damage susceptible multi-layer dielectric coatings by replacing the polarizing beam splitter beam cubes with uncoated calcium fluoride flats, and the high reflectivity multi-layer dielectric mirrors in the delay paths with magnesium fluoride—coated aluminum. The initial efficiency of the $MgF_2$ overcoated aluminum does not show reflectivity degradation when exposed to UV at either 248 nm or 193 nm; even at much higher power densities than those required in a low fluence multiplexer. The reduced reflectivity associated with the $MgF_2$ overcoated aluminum mirrors (compared to the multielectric layer type) is of no consequence in the life test mode because of the very small pulse energy density required at the samples under test: <0.1 $mJ/cm^2$, typically.

Uncoated $CaF_2$ flats are extremely resistant to UV irradiation damage when compared to beam splitter cubes.

The required 50/50 beam splitter function is accomplished simply by inserting the $CaF_2$ flat in the linear polarized beam at the correct angle. Fresnel reflection calculations to determine the necessary single-surface reflectivity of the two-sided $CaF_2$ flats so that 50/50, reflect/transmit performance is achieved lead to a required single-surface reflectivity close to 34%. The other approximately 16% reflection comes from back surface reflection.

Calculations to determine the required angle of incidence to produce a single-surface reflection of 34% yield an angle in the vicinity of 72.2 degrees for "S" polarized light. The angle can be fine-tuned in practice to account for material absorption and scatter losses, both surface and bulk.

The result is that the multiplexer of FIG. 12 is far more resistant to damage and less complex than multiplexers which use quarter wave plates and multi-layer dielectric coatings, both in the polarizing beam cubes and high reflectivity delay path mirrors.

A second function of the invention is to provide multiple beam paths so that many targets can be illuminated simultaneously.

Layout of Pulse and Beam Multiplier

A layout of a preferred optical system for multiplying pulses and beams is shown in FIG. 12. This layout assumes a horizontally linearly polarized 1000 Hz pulse laser beam leaving laser 20. The polarization of the laser beam is rotated 90 degrees to vertical polarization by polarization rotator 22 which preferably is formed by two 45° mirrors. (Of course, the rotator would not be required if the output from the laser were already vertictally polarized, or alternatively the optics to be described below could be arranged vertically to accommodate a horizontal polarization from the laser.) The beam strikes a first $CaF_2$ flat 31 and is split into reflected and transmitted beams of equal intensity. The reflected beam is again reflected by $MgF_2$ mirrors M41 and M42 and is then sent to the center of a second $CaF_2$ flat 32. Here it is again split into reflected and transmitted components of equal intensity. Leaving second $CaF_2$ flat 32 there are now two beams, each comprised of two pulses separated by the difference in the direct path from flat 31 to flat 32 and the 31 to M41 to M42 to 32 delay-path. This difference is set to be longer than the physical laser pulse length c xt (where c=speed of light; t=temporal pulse duration), so that the pulses are cleanly separated. For a pulse duration of 20 ns, the path distance difference preferably is about 6 meters.

Each of the two beams leaving flat 32 are split again by a second $CaF_2$ flat 34 and a third CaF flat 33. Mirrors M43 and M44 form a second delay path of a length approximately twice that of the 31 to M41 to M42 to 32 path. When recombined and split again at a fourth $CaF_2$ flat 35, the result is two beams (51 and 52) each containing four pulses. Similarly, the mirror pair M45 and M46 form a delay line of the same length as the M43 and M44 path. When recombined and split at $CaF_2$ flat 36, two more beams (53 and 54) containing four pulses are produced. In our preferred embodiment, the path 34 to 43 to 44 to 35 is greater than path 34 to 35 by about 12 meters. Similarly, path 32 to 45 to 46 to 33 is greater than path 32 to 33 by about 12 meters. Note that the pulses are shown with decreasing intensity as they are split by the $CaF_2$ flats. Note also that the snap shot pulse width is actually wider than that indicated on FIG. 12 since as stated above the typical pulse width is about 6 meters (i.e., about equal to the difference between the 31-32 and the 31-M41-M42-32 path lengths).

Each of the four beam paths delivers pulses at 4× the rate of the source laser, and each can be used to expose DUV material samples. The effective pulse repetition rate is 4 kHz in the case of a 1 kHz source laser, and 8 kliz in the case of a 2 kHz laser. In this preferred embodiment, all beam splitters are $CaF_2$ flats and all maximum reflection mirrors are $MgF_2$ overcoated aluminum mirrors.

If desired, and if there is enough pulse energy and space available, each of the four beams can be split into an additional 4, resulting in a total of 16 beams for sample exposure, each one delivering an effective pulse repetition rate of 32 kHz. This would allow the data acquisition rate in any one of the beams to exceed current rates by a factor of approximately 80. Also, any of the pulse multiplication techniques described above could be used to multiply pulses either upstream or downstream of this layout.

Persons skilled in the art will recognize that many other embodiments of the present invention are possible based on the teachings expressed in the above disclosure. For example, a possible modification to the FIG. 12 layout would be a twobeam, 2× multiplication layout in which the two beams leaving $CaF_2$ flat 32 would be utilized, eliminating the rest of the optics shown in FIG. 12.

Therefore, the reader should determine the scope of the present invention by the appended claims and their legal equivalents.

I claim:

1. An excimer laser system with pulse and beam multiplication comprising:
    A) an excimer laser configured to produce a laser output pulse beam at a pulse repetition rate of at least 500 laser output pulses per second, each pulse defining intensity values;
    B) a pulse multiplier optical system arranged to receive said output pulse laser beam, divide the beam into at least two beams and to multiply the number of pulses per second in each of said at least two beams by at least a factor of two so as to produce at least two multiplier output pulse beams comprised of a larger number of pulses with substantially reduced intensity values as compared with the laser output pulses.

2. An excimer laser system as in claim 1 wherein said pulse multiplier optical system comprises at least two beamsplitters and at least one delay path comprised of at least two maximum reflection mirrors.

3. An excimer laser system as in claim 1 wherein said pulse multiplier comprises six $CaF_2$ beamsplitters, and six maximum reflection $MgF_2$ overcoated aluminum mirrors configured to convert said output pulse beam into four subbeams, each of said subbeams having a pulse repetition rate of four times the pulse repetition rate of said repetition output pulse beam.

4. An excimer laser system as in claim 1 wherein said pulse multiplier optical system is contained in a module removably attached to said excimer laser.

5. An excimer laser system as in claim 1 wherein said pulse multiplier optical system is positioned on an optical table.

6. An excimer laser as in claim 1 wherein said excimer laser is an ArF laser.

7. An excimer laser system as in claim 2 wherein said at least two beamsplitters are comprised of $CaF_2$ and said at least two maximum reflection mirrors are $MgF_2$ overcoated aluminum mirrors.

8. An excimer laser system as in claim 5 wherein said excimer laser is configured to produce said output beam with vertical polarization.

9. An excimer laser system as in claim 5 wherein said laser system is configured to produce said output beam with horizontal polarization and further comprising a polarization rotator to rotate said polarization to vertical polarization.

10. An excimer laser system as in claim 7 wherein each of said $CaF_2$ beam splitters are aligned at about 72.2 degrees with an incoming laser beam.

11. An excimer laser system with pulse multiplication comprising:
    A) an excimer laser configured to produce a pulsed laser output beam at repetition rates of at least 500 pulses per second each pulse defining output intensity values,
    B) a pulse multiplier optical system arranged to receive said pulsed laser output beam, divide the beam into at least four beams and to multiply the number of pulses per second in each of said at least four beams by at least a factor of four so as to produce at least four multiplier output pulse beams comprised of a larger number of pulses with substantially reduced intensity values as compared with the laser output pulses;
    wherein said pulse multiplier comprises six $CaF_2$ beamsplitters, and six maximum reflection $MgF_2$ overcoated aluminum mirrors configured to convert said output pulse beam into four subbeams, each of said subbeams having a pulse repetition rate of four times the pulse repetition rate of said pulsed laser output beam; and
    wherein said $CaF_2$ beam splitters are aligned at about 72.2 degrees with an incoming laser beam.

* * * * *